United States Patent [19]

Skibida et al.

[11] Patent Number: 5,484,914
[45] Date of Patent: Jan. 16, 1996

[54] PROCESS FOR THE PRODUCTION OF OXYACIDS FROM CARBOHYDRATES

[75] Inventors: Irina P. Skibida; Andrei M. Sakharov; Aleksej M. Sakharov, all of Mosca, U.S.S.R.

[73] Assignee: Cerestar Holding B.V., Netherlands

[21] Appl. No.: 249,044

[22] Filed: May 24, 1994

Related U.S. Application Data

[63] Continuation of Ser. No. 865,899, Apr. 9, 1992, abandoned.

[30] Foreign Application Priority Data

Dec. 23, 1991 [EP] European Pat. Off. .............. 91122164

[51] Int. Cl.$^6$ .............................. C07H 1/00; C08B 31/18; C08B 33/08; C08B 37/02
[52] U.S. Cl. .............................. 536/124; 536/56; 536/102; 536/105; 536/112
[58] Field of Search .................................... 536/124, 1.11, 536/56, 102, 105, 112; 514/23; 252/388, 392, 174.17, 174.18; 426/321

[56] References Cited

U.S. PATENT DOCUMENTS

| | | | |
|---|---|---|---|
| 3,873,614 | 3/1975 | Lamberti et al. | 252/89 |
| 4,381,980 | 5/1983 | Ballschuh et al. | 562/43 |
| 4,424,346 | 1/1984 | Hall et al. | 536/20 |
| 4,983,757 | 1/1991 | Ishikawa et al. | 564/215 |

OTHER PUBLICATIONS

Starke, vol. 23, No. 4, dated Apr. 1, 1971, pp. 125–128.
The Journal of Physical Chemistry, vol. 30, 1926, pp. 939–953.

*Primary Examiner*—Michael G. Wityshyn
*Assistant Examiner*—Everett White
*Attorney, Agent, or Firm*—Bryan Cave

[57] ABSTRACT

A method for the production of oxyacids from carbohydrates by catalytic oxidation with an oxygen containing gas in an alkaline medium, wherein the oxidation is carried out by homogeneous catalysis in the presence of a catalytic amount of an ion of a transition metal selected from the group consisting of Cu, Cr, Co, Ni, Fe, V, Ti, Mn and mixtures thereof.

11 Claims, 7 Drawing Sheets

PROCESS FOR THE PRODUCTION OF OXYACIDS FROM CARBOHYDRATES

This is a continuation of U.S. application Ser. No. 07/865,899, filed Apr. 9, 1992 now abandoned.

The present invention relates to a process for the production of oxyacids from carbohydrates, by catalytic oxidation with an oxygen containing gas.

It is known to prepare polyhydroxycarboxylic acids by oxidation of saccharides and/or polysaccharides by means of electrochemical oxidation in the presence of $CaBr_2$ or by means of chemical oxidizing agents such as potassium permanganate, persulphates, sodium hypobromite or hypochlorite, and periodate. Such known processes have drawbacks deriving from the use of expensive and toxic reagents and furthermore deriving from a contamination of the reaction products with the oxidizing chemicals; in this connection, the presence of bromine or chlorine or compounds thereof in the oxidation products adversely effects the biodegradability properties of the obtained oxyacids.

Also known are methods of catalytic oxidation of carbohydrates with molecular oxygen, which indeed constitutes a very desirable oxidizing agent in view of its low cost and for environmental reasons.

In this connection, DE-B-2,123,621 describes a process for the production of aldonic acids by catalytic oxidation of sugar alcohols, which do not contain free aldehyde or ketone groups, with oxygen or with an oxygen containing gas, in an alkaline medium, in the presence of a noble metal catalyst, particularly platinum or palladium.

EP-A-0 232 020 describes a process for the oxidation of water soluble saccharides to polyhydroxycarboxylic acids with molecular oxygen in an alkaline medium in the presence of a noble metal catalyst bound to an inert support, wherein the catalyst is doped with a metal of groups IV, V or VI of the periodic table, particularly Pb or Bi.

Both of the above mentioned processes make use of expensive catalysts which require regeneration.

In view of the above state of the art, it is an object of the present invention to provide a new method for oxidation of carbohydrates, which is inexpensive and advantageous as regards the reagents used in the method.

A further object is to provide a method which, with the particular reference to the oxidation of starches and starch hydrolyzates, gives rise to an oxidation product with improved biodegradability properties.

BRIEF SUMMARY OF THE INVENTION

These and other objects which will be apparent from the description, are achieved by a method for the production of oxyacids from carbohydrates, by catalytic oxidation with an oxygen containing gas, in an alkaline medium, characterized in that the oxidation is carried out by homogeneous catalysis in the presence of a catalytic amount of an ion of a transition metal selected from the group consisting of Cu, Cr, Co, Ni, Fe, V, Ti, and Mn.

DETAILED DESCRIPTION

Carbohydrates, which constitute the substrate to which the oxidation method of the invention is applied, include:

monosaccharides such as natural pentoses and hexoses, particularly arabinose, glucose, fructose, and reduced monosaccarides, such as sorbitol, mannitol, erithritol, and arabitol;

disaccharides, such as maltose, saccharose, cellobiose, lactose and trehalose, and polysaccharides, particularly dextrines, dextranes, starch hydrolyzates, starch and cellulose.

The term starch is meant to include all starches and starch derivatives which are soluble in water or which may be solubilized or dispersed in water e.g. by addition of alkali or alkaline-earth metal hydroxides. The term starch therefore also includes amylose and amylopectin and starches having high amylose content, such as amylomaize and starches having high amylopectin content such as waxy starch. Native starches extracted from various plants such as potato, rice, tapioca, maize and cereals are preferred, particularly maize and potato starch.

Hydrolysis products of starch are constituted by mixtures of oligomers with various numbers of glucoside units, including glucose monomer. These starch hydrolyzates are easily obtainable, for example, by enzymatic hydrolysis, preferably with the use of endoenzymes.

It is believed that the active catalyst in the reaction is a complex between the anionic form of the substrate and the metal ion in homogeneous phase.

The metal ion is introduced into the alkaline medium by means of a salt thereof, preferably a sulphate or a chloride; the preferred metal ion is copper.

Typically, the metal ion concentration in the reaction medium is in the range of from $0.1 \cdot 10^{-2}$ to $4 \cdot 10^{-2}$ M.

The preferred bases, for use in the process of the invention, are alkali and earth-alkali metal hydroxides, particularly, sodium hydroxide and calcium hydroxide, amines such as ethylamine, diethylamine, triethylamine, and ammonia or quaternary ammonium hydroxides. Basic salt may also be used, such as sodium carbonate and bicarbonate, provided that they are added in an amount such as to achieve the desired alkaline conditions. The alkaline agent is added to the reaction medium in a concentration such as to obtain an initial pH in the range of from 7.5 to 14, preferably from 8 to 13 and such as to maintain alkaline conditions throughout the reaction and neutralize the oxyacids which constitute the reaction product.

The oxidation reaction is carried out by bubbling molecular oxygen or air through the alkaline medium at a temperature of from 20° to 100° C. The oxygen partial pressure may range from 0.02 to 10 MPa, the higher limit being dictated by economical reasons.

Oxidation of polysaccharides

Polysaccharides, as above defined, constitute a preferred substrate to which the process of the invention is applied.

It is believed that the process of the invention, when applied to cellulose, starch and starch hydrolyzates, provides a novel oxidation product which is endowed with improved properties, particularly improved biodegradability, which makes such product particularly useful for several applications, which will be seen in more detail in the following. Such oxidation products, obtained by the process of the invention, constitute, therefore, a further subject of the invention.

The content of polysaccharides in the aqueous medium is generally between 10 to 40% wt (dry basis), preferably 10 to 30% wt.

The oxidation of starch by molecular oxygen is preferably carried out at a temperature higher than that of starch gelatinization in the alkaline medium; under gelatinization condition the viscosity of the medium is very high and intensive mixing is required. In this connection pre-gelatinized starch is preferably used.

During the first 30–40 minutes of reaction, the rate of oxyacid formation is low due to poor mixing; however, the formation of carboxy groups (practically one COOH group per each 50–100 glucoside rings) lowers the viscosity of gelatine and increases solubility, so that the reaction may take place throughout all the reaction medium.

It is believed that the oxidation reaction proceeds initially with oxidation only of secondary hydroxy groups by cleavage of C—C bonds; the primary hydroxy groups appear to be more stable to oxidation as indicated by a comparison of the rates of starch and dextrane oxidation. The latter contains only few primary OH groups (as compared to starch); nevertheless the rate of dextrane oxidation is somewhat higher than that of starch oxidation in the same conditions.

Preferred conditions for the oxidation of starch, cellulose, starch hydrolyzates, dextrines and dextranes are a temperature in the range of from 50° to 80° C. and pH of from 8 to 13 which is maintained throughout the reaction process.

By operating at these conditions the undesirable degradative oxidation of the formed oxyacids with formation of $CO_2$, formic acid and low-molecular weight oxyacid is avoided. Also avoided is the formation of aldehydes, side products and their poly condensation which would lead to the formation of colored products.

At the end of the process the reaction medium consists of an aqueous solution or suspension of salts of oxyacids which are stable at pH 5–14 and are easily hydrolyzed in stronger acidic solutions with the formation of unstable acids which decompose quickly with formation of formic acid.

The catalyst can be removed from the reaction product by means of cationic resins, particularly sulphonic resins in the form of the sodium salts and aminodiacetic resins.

EXAMPLE 1

In a glass reactor having a volume of 1.5 l provided with a mechanical stirrer, oxygen diffuser and thermostatic jacket, 0.8 l of water, 0.2 kg of maize starch and 2.6 g copper sulphate ($CuSO_4 \cdot 5H_2O$) (copper ion concentration equal to $1 \cdot 10^{-2}$M), are introduced and then the stirrer is switched on at high revolution. Stirring is continued for about 2–3 minutes, until complete dissolution of the copper salt.

25 g of granular KOH (85% wt) are added and oxygen is introduced into the reaction volume through the diffuser at a rate of about 100 ml/min. At a temperature of about 60° C. the starch suspension begins to gelatinize, mixing becomes more difficult and stirring power is increased. After gelatinization the temperature is further increased to 80° C. and maintained constant. After 30 minutes of stirring at 80° C. in the oxygen atmosphere, there is a strong reduction of the viscosity of the gelatinized starch, due to the partial oxidation of the alcoholic groups to carboxylic groups, the effectiveness of stirring is further increased. After two hours from the beginning of the reaction at 80° C., the reaction stops as the result of complete neutralization of the oxyacids which are formed as the result of starch oxidation. At the end of the process (pH of about 8) the reaction product contains potassium salts of oxyacids at a concentration of about 0.3M expressed as moles of carboxylic groups in solution.

The results are summarized in table 1.

EXAMPLE 2–5

The procedure of example 1 was repeated with the use of different starch substrates and dextrane.

The conditions for each of examples 2–5 and the obtained results are summarized in table 1.

EXAMPLE 6–9

The procedure of example 1 was repeated by using different metal ions as catalysts, by subjecting to oxidation with molecular oxygen the hydrolyzate of amilopectine starch (molecular weight MW. of about $10^5$) at 75° C., with the use of sodium hydroxide as the base at a molar concentration in the reaction medium of 0.2 M.

The reaction conditions and the results are summarized in table 2.

TABLE 1

OXIDATION OF POLYSACCHARIDES WITH $O_2$

| Ex | substrate | g/l | catalyst | conc (M) | Base | concentration g/l | M | T(°C.) | reaction time (h) | oxyacid concentration (M) |
|---|---|---|---|---|---|---|---|---|---|---|
| 1 | Maize starch | 200 | $CuSO_4$ | $1 \cdot 10^{-2}$ | KOH | 25 | 0.37 | 80 | 2 | 0.30 |
| 2 | Potatoe starch | 200 | $CuSO_4$ | $1 \cdot 10^{-2}$ | $Ca(OH)_2$ | 50 | 0.65 | 95 | 6 | 1.10 |
| 3 | Sorgum starch | 250 | $CuCl_2$ | $1 \cdot 10^{-2}$ | NaOH | 28 | 0.70 | 75 | 5 | 0.65 |
| 4 | Maize starch | 200 | $CuSO_4$ | $1 \cdot 10^{-2}$ | $NH_4OH$ | — | 0.60 | 80 | 12 | 0.25 |
| 5 | Dextrane 7 (M.W. $10^7$) | 50 | $Cu(CH_3COO)_2$ | $5 \cdot 10^{-2}$ | NaOH | 10 | 0.25 | 75 | 8 | 0.22 |

TABLE 2

OXIDATION OF THE HYDROLYZATE OF AMYLOPECTIN STARCH
(MW $10^5$) AT 75° C. WITH NaOH 0.2 N

| Ex | Catalyst | conc (M) | oxygen flow rate moles/sec | reaction time (h) | $O_2$ moles | oxyacid concentration M |
|---|---|---|---|---|---|---|
| 6 | $CuSO_4.5H_2O$ | $1 \cdot 10^{-2}$ | $4.0\ 10^{-5}$ | 2 | 0.15 | 0.19 |
| 7 | $FeSO_4.7H_2O$ | $1 \cdot 10^{-2}$ | $2.3\ 10^{-5}$ | 5 | 0.025 | 0.06 |
| 8 | $Cr(NO_3)_3.9H_2O$ | $1 \cdot 10^{-2}$ | $1.5\ 10^{-5}$ | 5 | 0.06 | 0.14 |
| 9 | $Co(CH_3-COO)_2$ | $1 \cdot 10^{-2}$ | $2.0\ 10^{-5}$ | 3 | 0.09 | 0.17 |

$O_2$ = moles of consumed oxygen

EXAMPLE 10

The oxidation of cellulose was carried out in the glass reactor of example 1 provided with a thermostatic jacket and mechanical stirrer. Air was bubbled through the reaction medium throughout the overall oxidation process at atmospheric pressure.

100 g of microcrystalline cellulose, 3 g copper chloride $CuCl_2 \cdot 2H_2O$, 25 g NaOH, and 900 ml water were introduced into the reactor, and the temperature was maintained at 70° C. The reaction was carried out for 20 hours.

At the end of the reaction a heterogeneous solution was obtained:

content of non-dissolved cellulose: 50 g, weight of the soluble fraction of the oxydized reaction product: 50 g;

content of carboxylic groups: 1COOH group per each 2 glucosidic unit; the concentration in solution of the carboxylic groups was equal to about 0.17 molar (M).

EXAMPLE 11

Under the same conditions of example 10, oxidation of cellulose was carried out with molecular oxygen. The substrate which was used, was a cellulose obtained by treatment of acetyl-cellulose with a NaOH solution, in order to hydrolize the acetyl esters, which was then washed with distilled water and dried in air.

The oxidation of the hydrolized acetyl-cellulose (10% wt) was carried out in the presence of NaOH 0.1N (3.6 g of NaOH in solution). The oxidation of cellulose stops after neutralization of the base by the formed oxyacids.

The oxydized product includes water-soluble cellulose derivatives and non-water soluble cellulose derivatives. Table 3, hereinafter, provides the amount of the water soluble fraction of oxidized cellulose.

EXAMPLES 12–15

The oxidation of hydrolyzed acetyl-cellulose was carried out according to the procedure of example 11, by changing the concentration of alkali in solution. The reaction conditions and results of examples 12–15 are summarized in table 3.

TABLE 3

OXIDATION OF SUSPENSIONS OF HYDROLYZED
ACETYL-CELLULOSE (10% WEIGHT) IN WATER

| Examples | NaOH (M) | $O_2$* (moles) | Time of reaction (h) | Water-soluble fraction % |
|---|---|---|---|---|
| 11 | 0.1 | 0.06 | 6 | 7 |
| 12 | 0.3 | 0.14 | 9 | 15 |
| 13 | 0.5 | 0.30 | 10 | 23 |
| 14 | 0.7 | 0.37 | 10 | 30 |
| 15 | 0.9 | 0.45 | 10 | 40 |

*$O_2$ = moles of consumed oxygen

Figure 1:
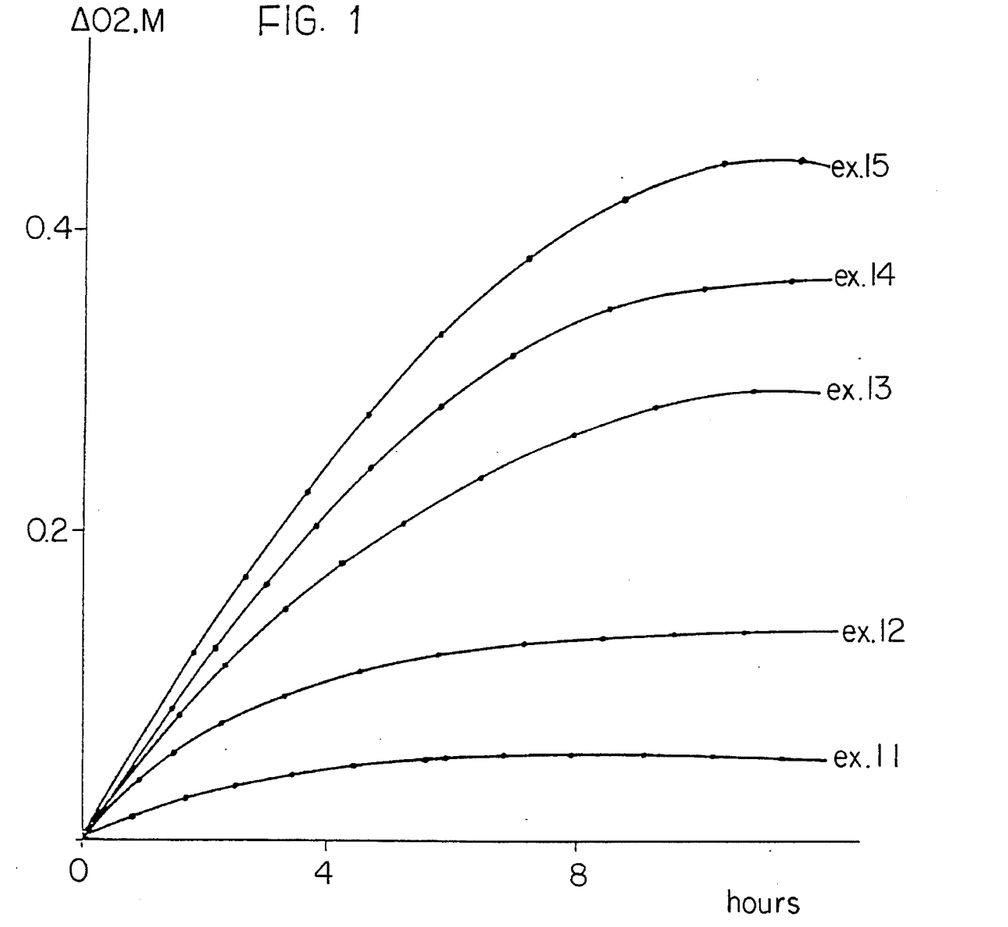
FIG. 1 shows the kinetic curves of oxygen uptake during the oxidation of cellulose under the conditions of Examples 11–15.

The kinetic curves of oxygen uptake during the oxidation of cellulose under the conditions of examples 11–15 are shown in FIG. 1.

The products of the oxidation of starch, starch hydrolyzates, cellulose, dextranes and dextrines may conveniently be used as a binder for paper, as a builder for detergents, as a polyelectrolyte coalescing agent in formulations for paints and printing inks, as a high molecular weight coalescent and, as a soil removing agent in detergent compositions. The use of the oxidized starch or starch hydrolyzates as a builder or co-builder for detergents is particularly advantageous in view of their improved biodegradability properties in comparison to the products obtained by oxidation with hypochlorite. In the use as a co-builder, the product is used in detergent formulations in association with known builders, such as zeolites to improve the anti-redeposition properties and dispersion capacity of the detergents and achieve an improved soil removal effectiveness.

Oxidation of mono- and disaccharides

Monosaccharides, reduced monosaccharides and disaccharides, as defined above, constitute a further substrate to which the process of the invention may be advantageously applied.

The oxidation is carried out in an aqueous alkaline medium with a concentration of the substrate preferably in the range of from 10 to 50% wt. The temperature of the reaction medium may vary in a wide range and is generally comprised between 25° and 80° C. preferably between 45° and 65° C.

Copper salts constitute the preferred source for the catalyst ion. The nature of the anion in the copper and the valence state of copper ions (cuptic or cuprous salts) do not generally influence the rate of the process and the product ratio in the course of reaction.

The complexes of the anionic form of the substrate with metal ions are formed in the reaction medium practically instantaneously after addition of the base to the water solution of polyols containing the catalyst salt. With the use of metalsalts as the catalyst, in order to avoid formation of insoluble metal hydroxides it is always necessary to add the base to the preliminary prepared solution containing the metal salts and the substrate. As the base, it is possible to use the same compounds which have been mentioned hereinbefore in connection with the oxidation of polysaccharides; sodium hydroxide, potassium hydroxide and calcium hydroxide are preferred.

Degradative oxidation of the substrate is to be carefully avoided; in this connection the pH throughout the reaction medium is preferably maintained in the range of from 7.5 to 12.

The equivalent ratio of oxygen consumed and COOH groups formed in the course of the reaction is equal to about 1.5:1.0. This is consistent with the reaction mechanism according to which the main reaction pathway is the interaction of oxygen with secondary hydroxy-groups leading to cleavage of C—C bonds and formation of two carboxylic groups:

$R_1CHOH\text{—}CHOH\text{—}R_2 + 1.5\ O_2 \rightarrow R_1COOH + R_2COOH + H_2O$ (2)

The chemical analysis of the reaction mixture shows that the main products of sorbitol and mannitol oxidation are glycolic, glyceric acids and some other high molecular weight oxyacids. Oxyacids are the primary products of saccharose oxidation.

The oxidation product of mono- and di-saccharides finds useful applications as a corrosion inhibitor agent and a food preservative agent.

EXAMPLES 16–19

Oxidation of maltose is carried out in a 0.5 l reactor provided with a mechanical stirrer, oxygen diffuser and thermostatic jacket. 20 g of maltose, 0.11 g of $CuSO_4.5H_2O$ (1.1 $10^{-3}$M), 400 ml distilled water and 2.5 ml of NaOH 1N (to pH 9) are added under stirring at 60° C. At this temperature oxygen is bubbled through the diffuser in the reaction medium. The reaction is monitored by base consumption which has to be added to maintain the pH at 9 due to the neutralization of the generated carboxylic groups.

Figure 2:
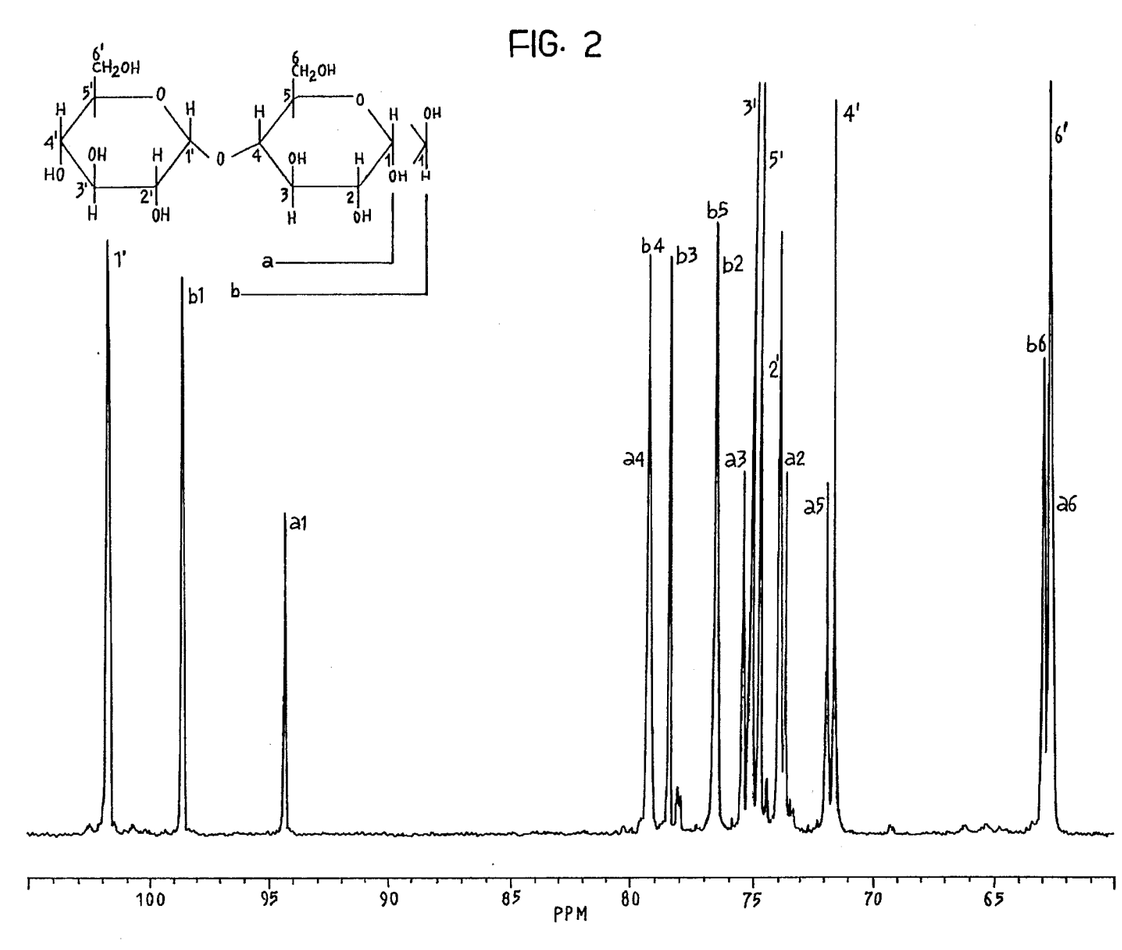
FIG. 2 is a $C^{13}$ NMR spectrum of maltose.
Figure 3:
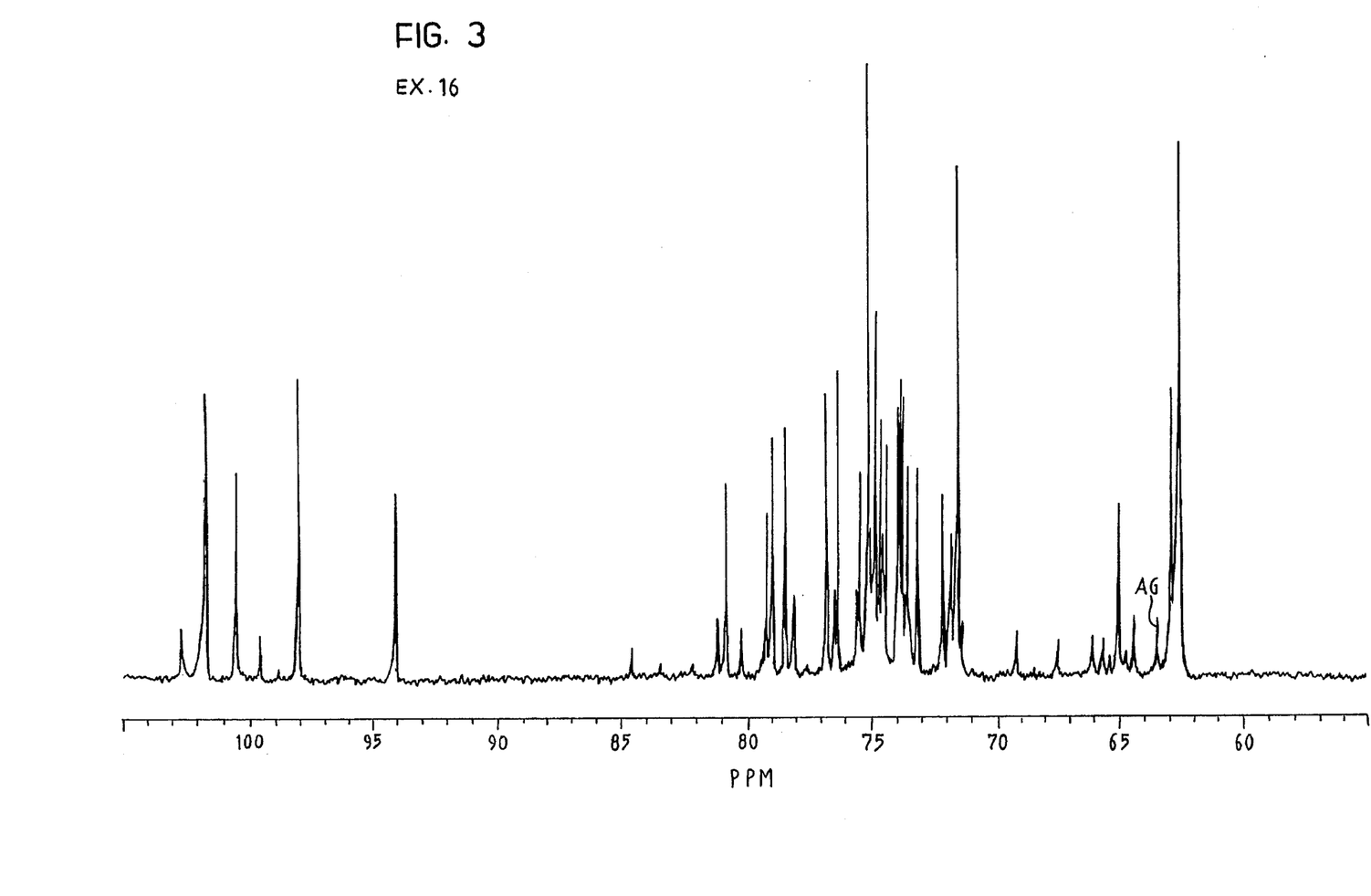
FIG. 3 is a $C^{13}$ NMR spectrum of the oxidized product from Example 16.
Figure 4:
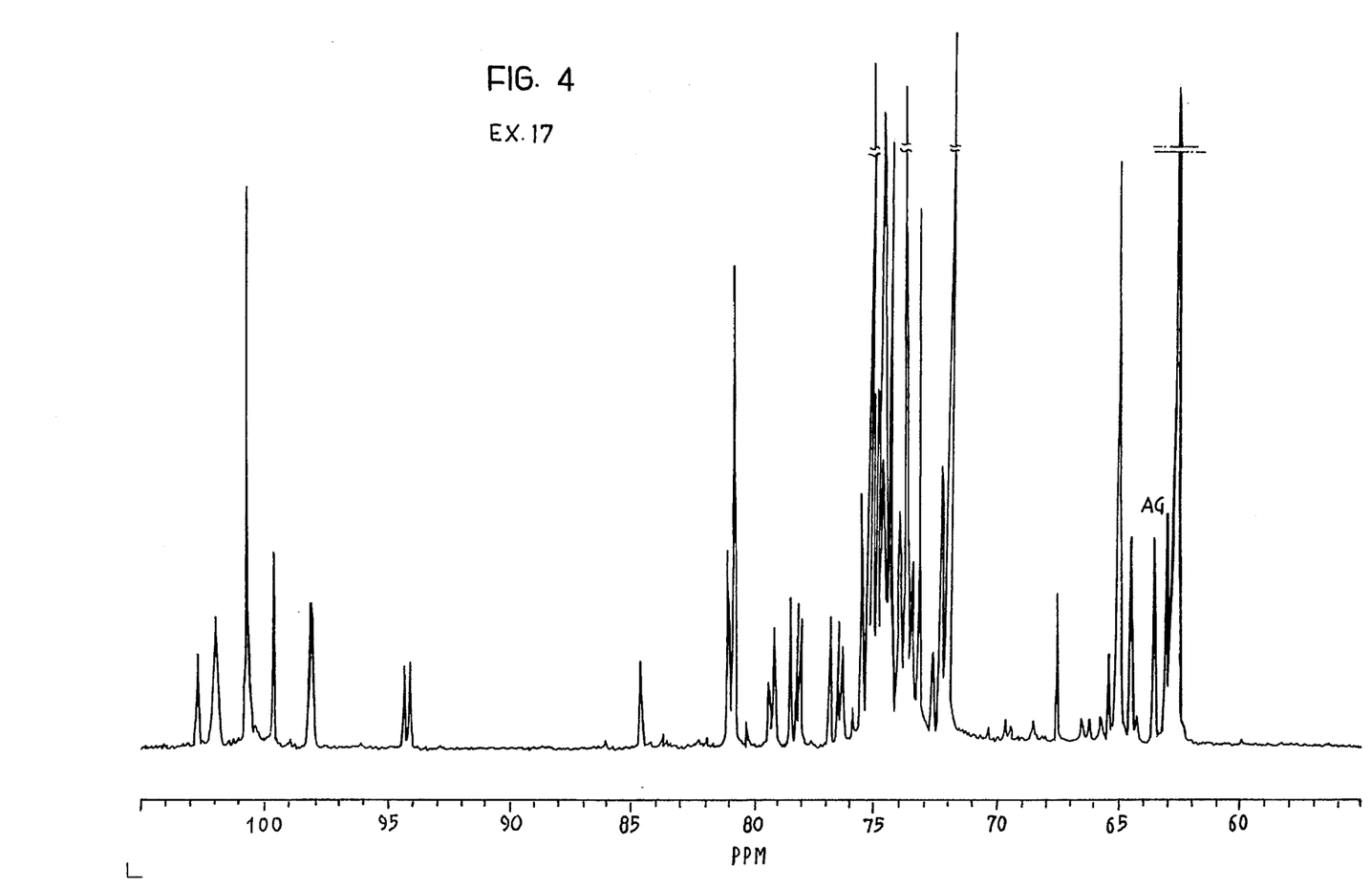
FIG. 4 is a $C^m$ NMR spectrum of the oxidized product from Example 17.
Figure 5:
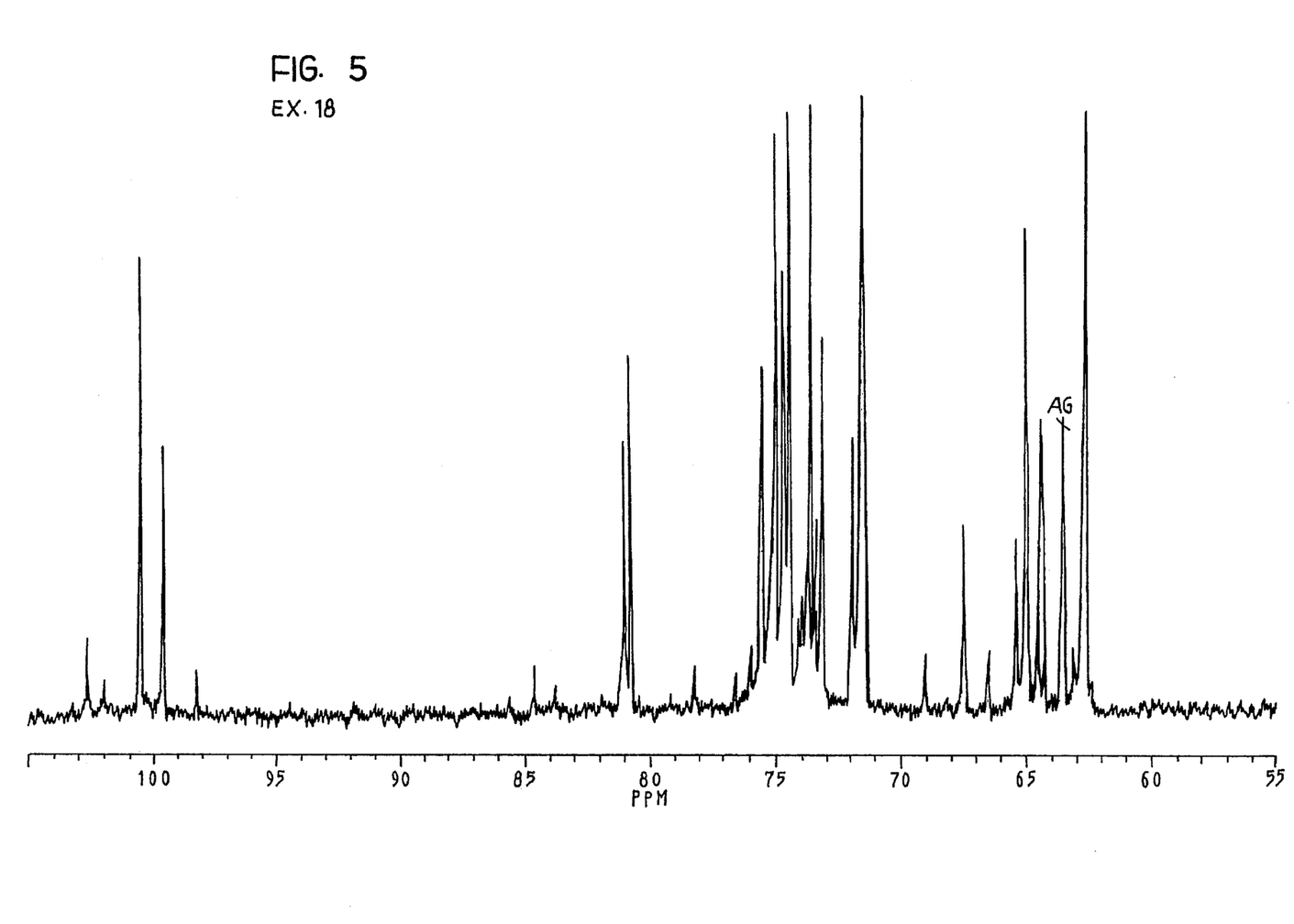
FIG. 5 is a $C^{13}$ NMR spectrum of the oxidized product from Example 18.
Figure 6:
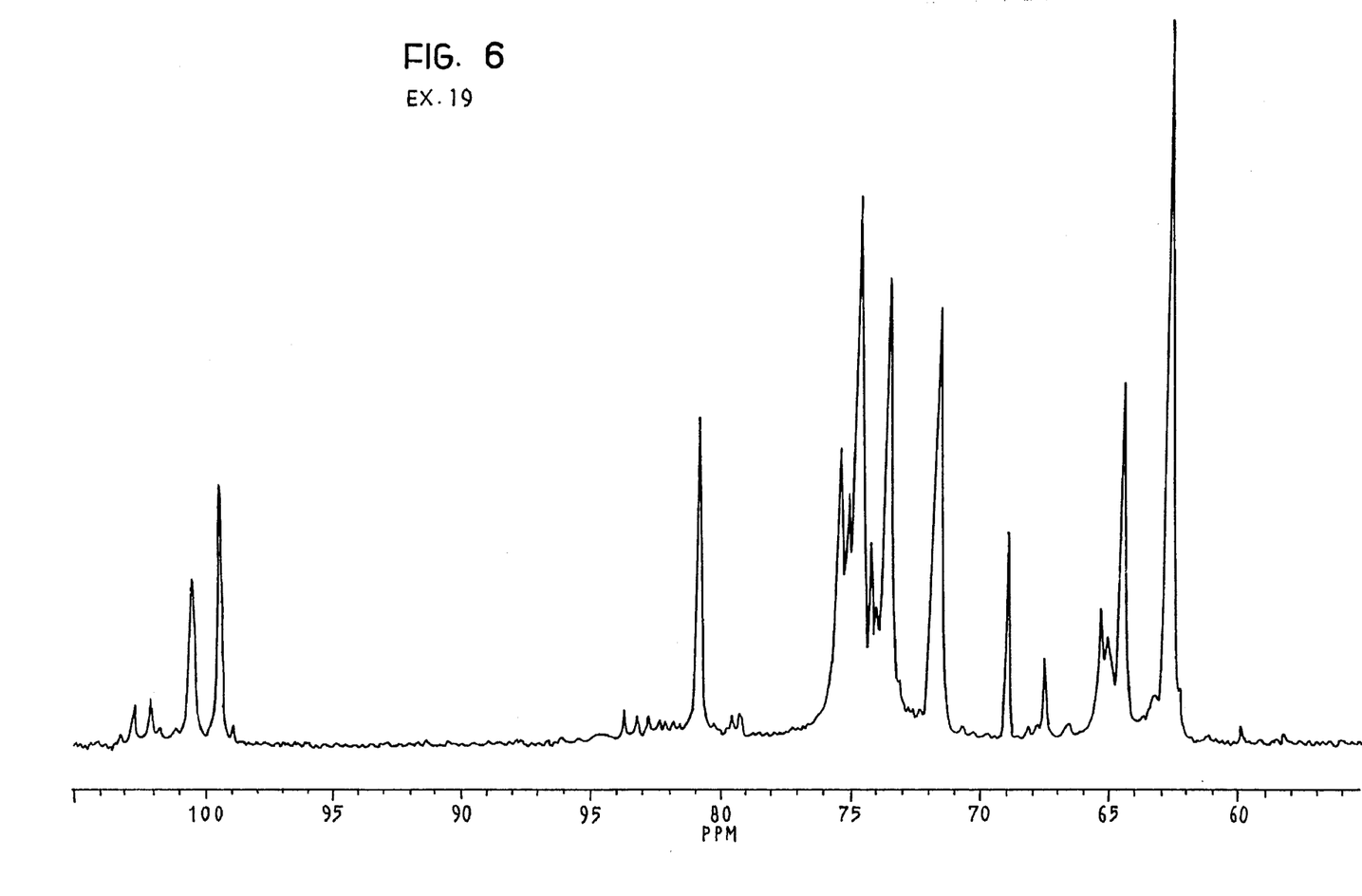
FIG. 6 is a $C^{13}$ NMR spectrum of the oxidized product from Example 19.
Figure 7:
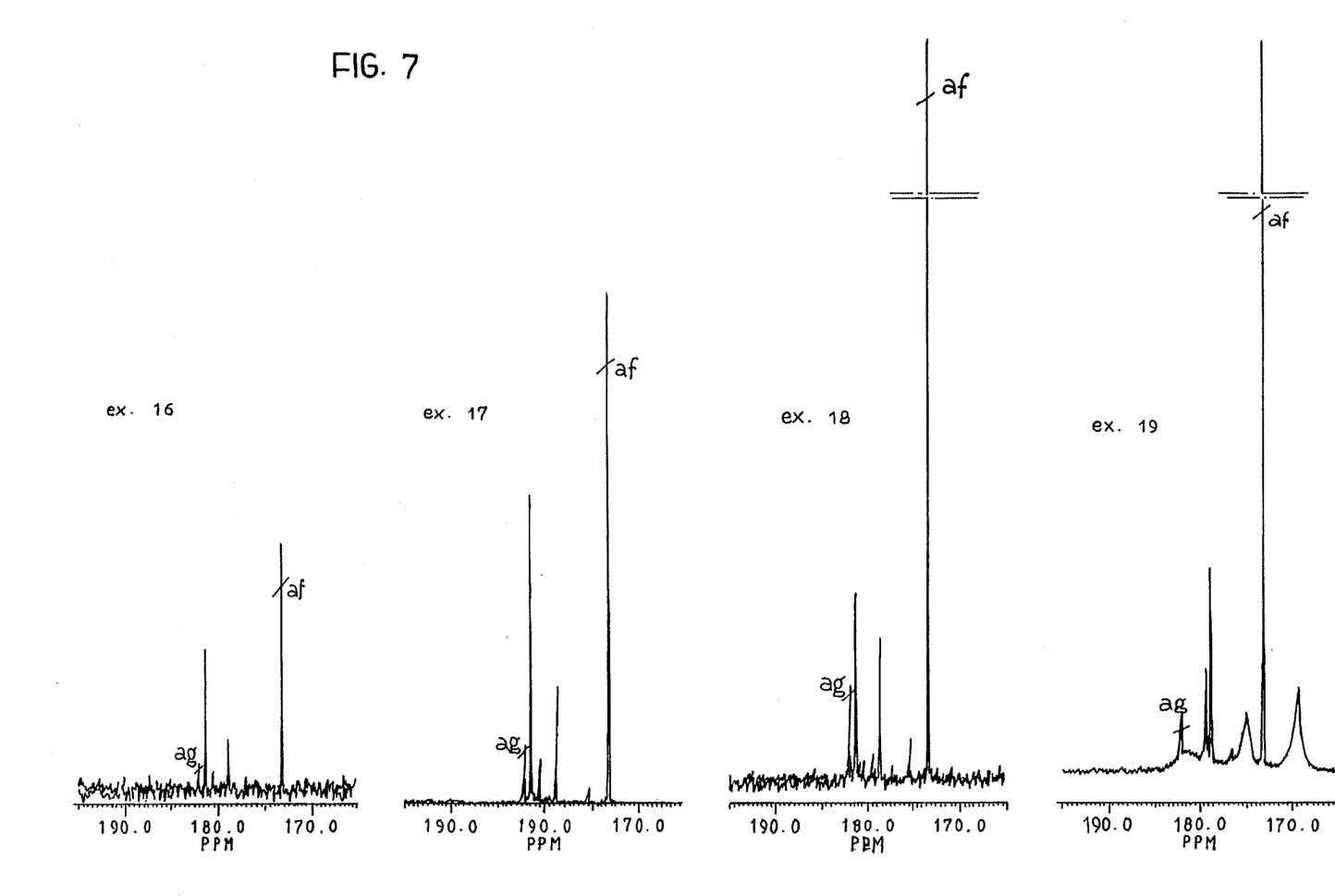
FIG. 7 is a compilation of the $C^{13}$ NMR spectra for Examples 16–19, showing new signals in the carbonyl region (190–160 ppm), including formic (af) and glycolic (ag) acids.

The above described procedure was repeated four times, stopping each reaction after addition of increasing pre-established amounts of the base, thereby obtaining four products at different degrees of oxidation (cf. Table 4). The products were recovered by removing the water by distillation under vacuum at 40° C. $C^{13}$ NMR spectra for each of the obtained products (FIGS. 3, 4, 5 and 6) compared with the $C^{13}$ NMR spectrum of the starting material (FIG. 2) show the typical modification of the original chemical structure:

the anomeric region (105–95 ppm) presents three new signals whose intensity increases with the degree of oxidation;

new signals appear in the carbonyl region, 190–160 ppm (FIG. 7) including those of formic (af) and glycolic (ag) acids:

the remaining part of the spectrum shows strong modifications.

TABLE 4

OXIDATION OF MALTOSE AT 60° C.

| Example | mmoles of substrate | NaOH mmoles consumption | reaction time (h) |
| --- | --- | --- | --- |
| 16 | 55.5 | 55.5 | 2.5 |
| 17 | 55.5 | 127.5 | 4.5 |
| 18 | 55.5 | 166.5 | 7 |
| 19 | 55.5 | 310.8 | 16 |

EXAMPLE 20

Oxidation of saccharose is carried out in the reactor of Example 1. 100 g of saccharose, 900 ml of $H_2O$ and 1,7 g of $CuCl_2.2H_2O$ $CuCl_2.2H_2O$ (concentration in the solution $1.10^{-2}$M) are introduced in the reaction and are added under stirring at 75° C. At this temperature 8 g of NaOH are added (concentration 0.2M) and oxygen is bubbled through the reaction medium through the diffuser. The reaction is monitored by oxygen and base consumption. The reaction stops after complete neutralization of the base by the oxyacids which constitute the reaction product; at the end of the process the pH is of about 8 with a reaction time of 4 hours. The concentration of oxyacids (glycolic acid, glyceric acid and higher molecular weight oxyacids) is determined by titration and chromatography by means of an ion exchange resin PARTISIL-sax. The overall oxyacids concentration is 0.18 M. Together with the oxyacids at the end of the reaction there is a small formation of sodium carbonate and of the sodium salt of formic acid in an amount not higher than 10% with respect to the total amount of the oxyacids.

The results are summarized in table 5.

EXAMPLES 21–25

The procedure of example 10 is repeated with the use of different metal ion catalysts and with the use of air as the oxygen containing gas (example 21); the reaction conditions and oxyacid concentrations found in the reaction product are summarized in table 5.

TABLE 5

OXIDATION OF SACCHMOSE AT 75° C.

| Ex. | Catalyst | Oxygen flow rate moles/sec | reaction time (h) | $O_2$ moles | oxyacid concentration M |
| --- | --- | --- | --- | --- | --- |
| 20 | $CuCl_2.2H_2O$ | 1.4 $10^{-5}$ | 4 | 0.15 | 0.18 |
| 21 X | $CuCl_2.2H_2O$ | — | 10 | — | 0.16 |
| 22 | $FeSO_4.7H_2O$ | 0.1 $10^{-5}$ | 10 | 0.02 | 0.04 |
| 23 | $Cr(NO_3)_3.9H_2O$ | 0.9 $10^{-5}$ | 6 | 0.06 | 0.13 |
| 24 | $Co(CH_3\text{—}COO)_2$ | 0.2 $10^{-5}$ | 8 | 0.04 | 0.09 |
| 25 | $NiCl_2$ | 0.1 $10^{-5}$ | 10 | 0.03 | 0.06 |

X oxydation with air

EXAMPLE 26

The oxidation of saccharose is carried out in a 150 ml autoclave, provided with a mechanical stirrer, at an oxygen pressure of 1.0 MPa in the presence of 100 ml of water, 0.17 g $CuCl_2.2H_2O$ ($1.10^{-2}M$), 8 g NaOH (2.0M) at a temperature of 75° C.; and a saccharose concentration of 20% by weight.

EXAMPLE 27

The procedure of Example 26 was repeated with the use of maize starch at a concentration of 20% by wt.

EXAMPLES 28–29

The procedures of examples 26 and 27 were repeated at an oxygen pressure of 0.1 MPa. The data of examples 26–29 are summarized in Table 6.

TABLE 6

| Examples | Substrate of oxidation | $P_{O2}$ MPa | Reaction time, h | Oxyacids concentration* |
|---|---|---|---|---|
| 26 | Saccharose | 1.0 | 3.0 | 1.9 |
| 27 | " | 0.1 | 10.0 | 1.7 |
| 28 | Maize starch | 1.0 | 4.0 | 1.8 |
| 29 | " | 0.1 | 20.0 | 1.6 |

*Calculated for 1 COOH-group

EXAMPLE 30

In a 22 l autoclave (provided with a stirring system and thermostatic jacket), 10 l of distilled water, 2 kg of maltodextrin (medium molecular weight of about $10^5$), 12.5 g of $CuSO_4.H_2O$, and 1.383 kg of NaOH pellets were added. 5 MPa of air were charged and the temperature was raised to 70° C. During 16 hours of reaction, oxygen exhausted air was renewed four times (about every three hours). The reaction mixture was cooled to room temperature. The final pH was equal to 9. Water was removed with spray drier equipment yielding 2.8 kg of a white powder. The results are summarized in Table 7.

EXAMPLES 31–32

The procedure of example 20 was repeated using commercial maize starch and starch hydrolyzate (medium molecular weight of about $1·10^3$). Conditions and results obtained in Examples 21–22 are summarized in Table 7.

TABLE 7

OXIDATION OF STARCH AND STARCH HYDROLYZATES UNDER PRESSURE WITH AIR (5 MPa)

| Example | substrate | mmoles of NaOH/ Gl.units | T °C. | React. time (h) | Oxyacid conc. |
|---|---|---|---|---|---|
| 30 | Maltodextrin | 2.8 | 70 | 16 | 2.34 M |
| 31 | Hydrolized Starch | 2.8 | 65 | 12 | 2.47 M |
| 32 | Starch | 2.8 | 75–80 | 16 | 2.21 M |

Table 8 summarizes the preferred conditions for oxidation of different mono- and di-saccharides, maize starch and maize starch hydrolyzates with references to aqueous solutions having a concentration of the substrate of 10% by wt.

TABLE 8

PREFERRED CONDITIONS FOR CARBOHYDRATES OXYDATION (AQUEOUS SOLUTIONS 10% W/W)

| Carbohydrate | T° C. | Concentration of base, NaOH, M | Catalyst concentration Cu(II) · $10^3$, M |
|---|---|---|---|
| D - Mannitol | 30 ÷ 50 | 0.05 ÷ 0.10 | 3.0 |
| D - Sorbitol | 40 ÷ 60 | 0.10 ÷ 0.15 | 5.0 |
| Dulcitol | 40 ÷ 60 | 0.05 ÷ 0.10 | 5.0 |
| L-Arabinose | 30 ÷ 50 | 0.05 | 10.0 |
| D - Glucose | 30 ÷ 50 | 0.05 | 5.0 |
| L - Ramnose | 40 ÷ 60 | 0.20 ÷ 0.50 | 5.0 |
| D - Lactose | 40 ÷ 50 | 0.10 ÷ 0.20 | 5.0 |
| D - Maltose | 30 ÷ 60 | 0.05 ÷ 0.10 | 10.0 |
| Saccharose | 60 ÷ 80 | 0.20 ÷ 0.40 | 5.0 |
| Hydrolised Maize starch, M.W. $10^3 - 10^5$ | 60 ÷ 70 | 0.10 ÷ 0.30 | 20.0 |
| Maize starch | 70 ÷ 80 | 0.10 ÷ 0.20 | 10.0 |

We claim:

1. A method for the production of oxyacids from a carbohydrate, said method comprising oxidizing said carbohydrate with an oxygen containing gas in an alkaline medium in the presence of a catalytic amount of a Cu ion, wherein the oxidation is carried out by homogeneous catalysis.

2. A method according to claim 1, wherein the carbohydrate is first dissolved or dispersed in an alkaline aqueous medium with the addition of a catalytic amount of said Cu ion and then molecular oxygen is fed through said medium with the addition of an amount of base such as to maintain the pH in alkaline conditions throughout the oxidation reaction.

3. A method according to claim 1 wherein the reaction medium is maintained in alkaline conditions by addition of an alkaline agent selected from the group consisting of alkali, alkaline-earth metal hydroxides, ethylamine, diethylamine, triethylamine, ammonia and quaternary ammonium hydroxides.

4. A method according to claim 1 wherein the carbohydrate is present in the reaction medium in an amount of from 5 to 50% wt and the metal ion molar concentration is from $0.01·10^{-2}$ to $4·10^{-2}M$.

5. A method according to claim 1 wherein the oxidation reaction is carried out at a temperature of from 25° to 100° C. with oxygen partial pressure of from 0.02 to 10 MPa.

6. A method according to claim 1 wherein the carbohydrate subjected to oxidation is selected from the group consisting of cellulose, starch, starch hydrolyzates, dextrines, dextranes, mono-, di- and tri-saccharides.

7. A method according to claim 1 wherein the carbohydrate is selected from the group consisting of cellulose, starch, starch hydrolyzates, dextrines and dextranes and the reaction is carried out with addition of base in an amount such as to maintain a pH of from 8 to 13, at a temperature of from 50° to 80° C.

8. A method according to claim 1, wherein the carbohydrate is selected from the group consisting of maltose, saccharose, reduced monosaccharides and the reaction is carried out with addition of a base in an amount such as to maintain a pH of from 7.5 to 12, at a temperature of from 25° to 80° C.

9. A method for the production of oxyacids from a carbohydrate, said method comprising oxidizing said carbohydrate with an oxygen containing gas in an alkaline medium in the presence of a catalytic amount of a Cr ion, wherein the oxidation is carried out by homogeneous catalysis.

10. A method for the production of oxyacids from a carbohydrate, said method comprising oxidizing said carbohydrate with an oxygen containing gas in an alkaline medium in the presence of a catalytic amount of a Co ion, wherein the oxidation is carried out by homogeneous catalysis.

11. A method for the production of oxyacids from a carbohydrate, said method comprising oxidizing said carbohydrate with an oxygen containing gas in an alkaline medium in the presence of a catalytic amount of a Ni ion, wherein the oxidation is carried out by homogeneous catalysis.

* * * * *